United States Patent [19]

Williams et al.

[11] Patent Number: 5,626,800
[45] Date of Patent: May 6, 1997

[54] PREVENTION OF GROOVE TIP DEFORMATION IN BRIGHTNESS ENHANCEMENT FILM

[75] Inventors: Todd R. Williams, Lake Elmo, Minn.; Daniel J. Kingston, Hudson, Wis.

[73] Assignee: Minnesota Mining and Manufacturing company, St. Paul, Minn.

[21] Appl. No.: 382,997

[22] Filed: Feb. 3, 1995

[51] Int. Cl.⁶ .................................. B29D 11/00
[52] U.S. Cl. ................ 264/1.38; 264/1.7; 264/1.9; 264/2.6
[58] Field of Search .............. 264/1.7, 2.6, 2.7, 264/235, 346, 1.38, 1.9

[56] References Cited

U.S. PATENT DOCUMENTS

| | | |
|---|---|---|
| 3,935,359 | 1/1976 | Rowland .................. 428/172 |
| 4,181,766 | 1/1980 | Williams et al. ........... 428/216 |
| 4,262,072 | 4/1981 | Wendling et al. ........... 430/14 |
| 4,340,276 | 7/1982 | Maffitt et al. ............. 350/164 |
| 4,388,436 | 6/1983 | Chen . | 
| 4,542,449 | 9/1985 | Whitehead ............... 362/330 |
| 4,576,850 | 3/1986 | Martens ................. 428/156 |
| 4,582,885 | 4/1986 | Barber .................. 528/28 |
| 4,668,558 | 5/1987 | Barber .................. 428/156 |
| 4,973,629 | 11/1990 | Williams et al. . | 
| 5,175,030 | 12/1992 | Lu et al. ................. 428/30 |
| 5,183,597 | 2/1993 | Lu ....................... 264/1.4 |
| 5,229,882 | 7/1993 | Rowland ................ 359/530 |

FOREIGN PATENT DOCUMENTS

0528645A2  8/1992  European Pat. Off. .

*Primary Examiner*—Mathieu D. Vargot
*Attorney, Agent, or Firm*—Gary L. Griswold; Walter N. Kirn; Robert H. Jordan

[57] ABSTRACT

A method of producing a microstructure bearing article that includes the steps of molding the microstructure on the base, curing the resin that forms the microstructure, and heat treating the microstructure. The heat treating is performed at a temperature that is at least equal to a normal glass transition temperature of the resin. The heat treating raises the glass transition temperature of the resulting polymer above approximately 333° K. such that groove tip impression is reduced. Such articles are useful in backlit displays which are useful in computers and the like.

29 Claims, 3 Drawing Sheets

PREVENTION OF GROOVE TIP DEFORMATION IN BRIGHTNESS ENHANCEMENT FILM

BACKGROUND OF THE INVENTION

The present invention relates generally to a method of producing a microstructure bearing composite article that exhibits superior tip deformation resistance qualities. More particularly, the present invention relates to a method of reducing groove tip impression in a brightness enhancement film, in which the key geometrical features of useful brightness enhancement film articles are disclosed.

The use of the microstructure bearing article as a brightness enhancement film is shown in Whitehead, U.S. Pat. No. 4,542,449. One example of a microstructure bearing article, which is useful as a brightness enhancement film, is described in Lu et al., U.S. Pat. No. 5,175,030, and Lu, U.S. Pat. No. 5,183,597. These patents disclose microstructure bearing composite plastic articles and a method of molding the microstructure bearing composite plastic articles. The Lu et al. patent and the Lu patent address forming the microstructure with desired optical properties, such as total internal reflection.

Microstructure bearing articles are made in a variety of forms. One such form includes a series of alternating tips and grooves. One example of such a form is brightness enhancement film, which has a regular repeating pattern of symmetrical tips and grooves. Other examples include patterns in which the tips and grooves are not symmetrical and in which the size, orientation, or distance between the tips and grooves is not uniform.

One major draw back of prior art radiation cured brightness enhancement films is that dark spots were occasionally seen in prior art brightness enhancement films. While the dark spots do not affect the measured brightness enhancement of the product, the dark spots are undesirable because the spots detrimentally affect the cosmetic appearance of the brightness enhancement film. As a result, manufacturers of displays desire brightness enhancement films that do not have such dark spots.

Prior art brightness enhancement films include "Brightness Enhancement Film", a version made from polycarbonate thermoplastic, sold by Minnesota Mining and Manufacturing Company, St. Paul, Minn. and "DIAART" a version made of a radiation cured microstructured layer on a polyester base, sold by Mitsubishi Rayon, Tokyo, Japan.

SUMMARY OF THE INVENTION

The present invention provides a method of producing a microstructure bearing article that includes the steps of molding the alternating tips and grooves on the base, curing the resin that forms the tips and grooves, and heat treating the tips and grooves. The heat treating is performed at a temperature that is at least equal to a normal glass transition temperature of the resin and may be done simultaneously with curing the resin (curing at an elevated temperature) or as a post cure treatment. The heat treating is effective to raise the glass transition temperature of the resulting polymer above approximately 333° K. such that groove tip impression is reduced. In addition, a crosslinking agent may be added to help in raising the glass transition temperature.

The invention also provides backlit displays comprising such articles and computers comprising such displays.

BRIEF DESCRIPTION OF THE DRAWINGS

FIGS. 1 and 2, which are not to scale, are intended to be merely illustrative and non-limiting.

DETAILED DESCRIPTION OF THE PREFERRED EMBODIMENTS

The present invention provides a method of producing a microstructure bearing polymeric article having alternating grooves and tips on a base or substrate that is resistant to groove tip impression. The terms "base" and "substrate" are used interchangeably herein. The method according to the present invention provides for the formation of a microstructure bearing article that resists groove tip deformation when used as a brightness enhancement film.

Figure 1:
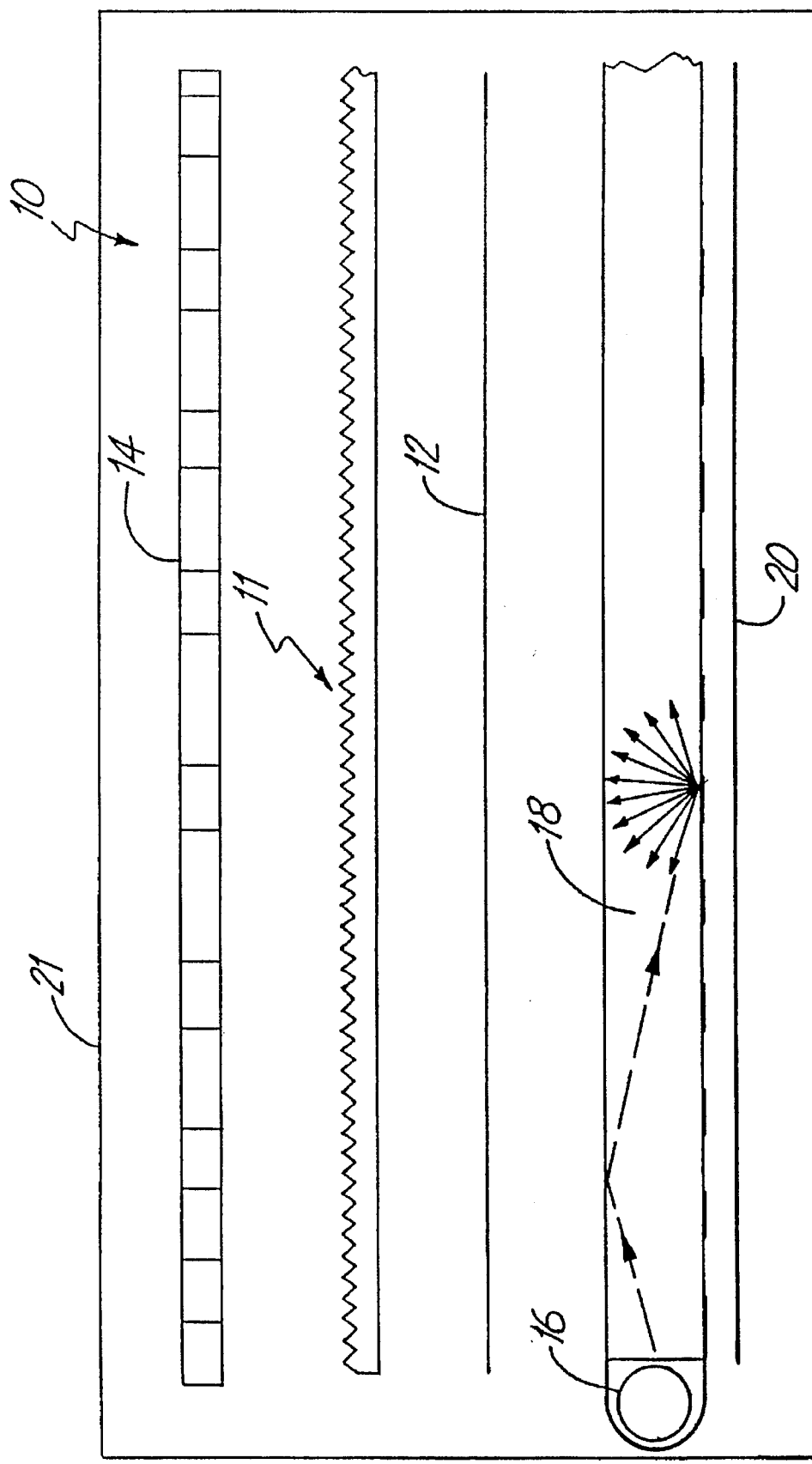
FIG. 1 is a schematic view of an illustrative film of the present invention in the backlit liquid crystal display.
Figure 2:
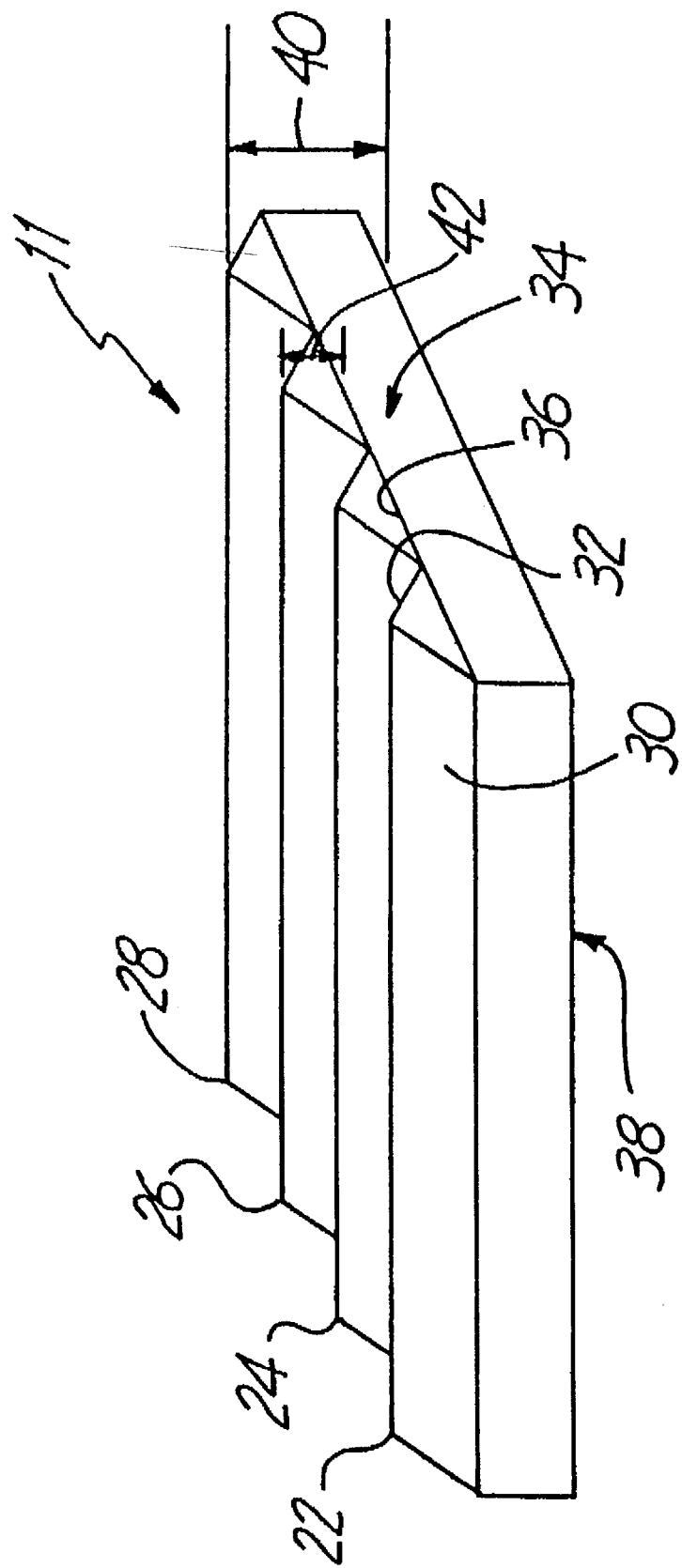
FIG. 2 is a perspective view of an illustrative microstructure bearing polymeric article of the present invention.

An illustrative backlit liquid crystal display generally indicated at 10 in FIG. 1 includes a brightness enhancement film 11 of the present invention, which is typically positioned between a diffuser 12 and a liquid crystal display panel 14. The backlit liquid crystal display also includes a light source 16 such as a fluorescent lamp, a light guide 18 for transporting light for reflection toward the liquid crystal display panel 14, and white reflector 20 for reflecting light also toward the liquid crystal display panel. The brightness enhancement film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancement film 11 in the backlit liquid crystal display is useful in equipment such as computers, personal televisions, video recorders, mobile communication devices, and automobile and avionic instrument displays, represented by reference character 21. The brightness enhancement film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 are formed on a body portion 34 that has a first surface 36 on which the prisms are formed and a second surface 38 that is substantially flat or planar and opposite the first surface.

A linear array of regular right prisms is preferred for both optical performance and ease of manufacture. By right prisms, it is meant that the apex angle $\Theta$ is typically 90°, but can also range from 70° to 120° and most preferably from 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. A typical ratio of prism height 42 to total thickness 40 is generally between 25/125 and 2/125.

The angle that the facets would form with the surface 38 if the facets were to be projected would typically be 45°. However, this angle would vary depending on the pitch of the facet or the angle $\Theta$ of the apex.

It has been discovered that the dark spots seen with the prior art radiation cured brightness enhancement films were caused by deformation in the tips of the brightness enhancement film. Tip deformation commonly results when a weight or force is placed on the brightness enhancement film or when an object strikes the brightness enhancement film. Tip deformation is used herein synonymously with groove tip impression.

It has also been discovered that when the glass transition temperature of the polymer used in the brightness enhancement film is raised above about 333° K., the brightness enhancement film becomes more resistant to groove tip impression. 333° K. is above the normal glass transition temperature of the polymer used in the brightness enhancement film. The normal glass transition temperature is the glass transition temperature obtained when the polymer is cured by ultraviolet radiation at ambient temperature.

Elevation of the glass transition temperature can be accomplished using a variety of methods. For example, the glass transition temperature can be changed over a broad range by elevating the temperature while the brightness enhancement film is cured. The glass transition temperature can also be elevated by subjecting the brightness enhancement film to a post-cure heat treatment and by adding crosslinking materials.

The microstructure bearing article is preferably formed according to a process similar to the processes disclosed in Lu et al., U.S. Pat. No. 5,175,030, and Lu, U.S. Pat. No. 5,183,597. The formation process preferably includes the following steps:

(a) preparing an oligomeric resin composition;

(b) depositing the oligomeric resin composition onto a master negative microstructured molding surface in an amount barely sufficient to fill the cavities of the master;

(c) filling the cavities by moving a bead of the composition between a preformed substrate and the master, at least one of which is flexible; and (d) curing the oligomeric composition.

The oligomeric resin composition of step (a) is a one-part, solvent-free, radiation-polymerizable, crosslinkable, organic oligomeric composition. The oligomeric composition is preferably one which gives a cured polymer of high refractive index, that is a refractive index above 1.56 and preferably above 1.58. The high refractive index is beneficial to the optical performance of the brightness enhancement film. One preferred suitable oligomeric composition is a blend of aromatic epoxy-derived acrylate or multi-acrylate and one or more reactive diluents (used to control viscosity of the composition), preferably including at least one acrylate ester containing an aromatic group. This combination provides a cured resin with an acceptable combination of high refractive index and high glass transition temperature.

In the preferred oligomeric resin composition, the epoxy acrylate or multiacrylate is between about 40 and 80 percent by weight and preferably between about 55 and 65 percent by weight of the oligomeric composition. The reactive diluent(s) is between about 20 and 60 percent by weight and preferably between about 35 and 45 percent by weight of the oligomeric composition.

For brightness enhancement films, high refractive index is beneficial to the optical performance. Therefore, the oligomeric composition also preferably gives a cured polymer of a high refractive index, that is a refractive index above 1.56.

The epoxy diacrylate can be chosen from a number of such compounds available commercially, such as the "PHOTOMER" Brand series: 3015, 3016, and 3038 (from Henkel Corp., Ambler, Pa.), and the "EBECRYL" Brand series: 600, 1608, 3201, 3500, and 3600 (from UCB-Radcure, Smyrna, Ga.). Key criteria in selecting an oligomer are refractive index and homopolymer glass transition temperature. Increasing the number of atoms connecting the acrylate groups and the aromatic groups will typically reduce both refractive index and glass transition temperature, but may increase flexibility of the cured resin. Such connecting groups are often in the form of ethoxy or propoxy groups.

The epoxy diacrylate can also be modified by addition of bromine. The bromine modified epoxy diacrylate is preferably RDX 51027, which has about two bromine atoms on each phenyl group. RDX 51027 can be obtained from UCB-Radcure of Smyrna, Ga.

Monomers are typically added to radiation curable oligomeric resin compositions to reduce the normally high viscosity of the oligomer. Such monomers may also be used to modify properties of the cured resin, such as flexibility, refractive index, and glass transition temperature. Examples of such monomers are listed in U.S. Pat. No. 4,668,558 along with the normal glass transition temperatures of their homopolymers and include isobornyl acrylate (367° K.), methyl methacrylate (378° K.), cyclohexylchloroacrylate (372° K.), 2-chlorostyrene (406° K.), 2,4-dichlorostyrene (406° K.), styrene (373° K.), acrylic acid (360° K.), acrylamide, acrylonitrile (393° K.), methacrylonitrile (393° K.). High reactivity monomers that have high refractive indices, such as phenoxyethyl acrylate and benzyl acrylate, are especially preferred.

Acrylate functional monomers and oligomers are preferred because they polymerize more quickly under normal curing conditions. Further, a large variety of acrylate esters are commercially available. However, methacrylate, acrylamide and methacrylamide functional ingredients can also be used without restriction. Herein, where "acrylate" is used, "methacrylate" is understood as being acceptable. Styryl functional monomers can be included, but usually in relatively minor amounts to ensure complete polymerization, especially with radiation curing.

Polymerization can be accomplished by usual means, such as heating in the presence of free radical initiators, irradiation with ultraviolet or visible light in the presence of suitable photoinitiators, and by irradiation with electron beam. For reasons of convenience, low capital investment, and production speed, the preferred method of polymerization is by irradiation with ultraviolet or visible light in the presence of photoinitiator at a concentration of about 0.1 percent to about 1.0 percent by weight of the oligomeric composition. Higher concentrations can be used but are not normally needed to obtain the desired cured resin properties.

The viscosity of the oligomeric composition deposited in step (b) is preferably between 500 and 5,000 centipoise (500 and $5,000 \times 10^{-3}$ pascal-seconds). If the oligomeric composition has a viscosity above this range, air bubbles might become entrapped in the composition. Additionally, the composition might not completely fill the cavities in the master. When an oligomeric composition with a viscosity below that range is used, the oligomeric composition usually experiences shrinkage upon curing that prevents the oligomeric composition from accurately replicating the master.

Polyethylene terephthalate or polycarbonate film are preferable for use as a substrate in step (c) because the materials are economical, optically clear, and have good tensile strength. Thicknesses of 0.025 millimeters to 0.5 millimeters are preferred and thicknesses of 0.075 millimeters to 0.175 millimeters are especially preferred.

Almost any material can be used for the base (substrate), as long as that material is substantially optically clear, has enough strength to allow handling during casting of the microstructure, and manufacture of a display assembly in which the microstructure bearing article is used. In addition, the material used for the base should be chosen so that it has sufficient thermostability and resistance to aging so that performance of the display assembly in which the article of the present invention is used is not compromised over its typical lifetime.

Other useful substrates for the microstructure bearing articles include cellulose acetate butyrate, cellulose acetate propionate, polyether sulfone, polymethyl methacrylate, polyurethane, polyester, polyvinyl chloride, and glass. The surface of the substrate may also be treated to promote adhesion to the oligomeric composition.

Polyethylene terephthalate base materials having good optical qualities and acceptable adhesion are preferred. Examples of such polyethylene terephthalate based materials include: a photograde polyethylene terephthalate; a polyethylene terephthalate (PET) having a surface that is formed according to the method described in U.S. Pat. No. 4,340, 276 (Example 5), referred to herein as "SEP-PET"; and MELINEX PET manufactured by ICI Films of Wilmington, Del. The SEP-PET has a material such as chromium applied in an amount which results in a composite surface on which portions of the underlying PET are exposed between discontinuous microislands of the material. The composite surface is sputter etched with an oxygen plasma to preferentially etch the exposed portions of the higher sputtering rate PET, while the discontinuous microislands are etched at a lower rate, resulting in a topography of micropedestals which vary in height within a range of approximately 0.01 and 0.2 µm and which are separated from adjacent micropedestals a distance within a range of approximately 0.05 to 0.5 µm.

A preferred master for use with the above described method is a metallic master, such as nickel, nickel-plated copper or brass. If the temperature of the curing and optionally simultaneous heat treating step is not too great, the master can also be constructed from a thermoplastic material, such as a laminate of polyethylene and polypropylene.

Alter the oligomeric resin fills the cavities between the substrate and the master, the oligomeric resin is cured and heat treated. Curing and heat treating is preferably accomplished using one of the following methods.

A first method includes radiation curing of the resin at an elevated temperature. The preferred resins are curable using radiation, such as from ultraviolet light or from an electron beam, which is conventionally conducted at room temperature. Curing the resin at an elevated temperature raises the glass transition temperature of the resultant article to an extent that reduces groove tip impression to a satisfactory level.

In this embodiment, the resin is cured at a temperature at least equal to the desired glass transition temperature and preferably above the desired glass transition temperature. The resin is preferably cured at a temperature of at least 10° C. (10° K.) above the normal glass transition temperature and most preferably at a temperature of at least 20° C. (20° K.) above the normal glass transition temperature. For the oligomeric composition that is a blend of epoxy diacrylate and phenoxyethyl acrylate, the cure temperature is preferably about 85° C. (385° K.).

A second method includes curing the resin and then subjecting the resin to a post-cure heat treatment. The post-cure heat treatment involves heating the cured resin at a temperature at least equal to the normal glass transition temperature of the polymer for approximately 60 seconds. The heating temperature is preferably at least 10° C. (10° K.), and most preferably at least 20° C. (20° K.), above the normal glass transition temperature.

A third method includes adding a crosslinking agent to the resin to further aid in the crosslinking of the polymer, which will also result in elevation of the glass transition temperature. Illustrative examples of suitable crosslinking agents include 1,4-butylene di-methacrylate or -acrylate; ethylene di-methacrylate or -acrylate; trimethylolpropane di- or tri-acrylate; glyceryl di-acrylate or -methacrylate; glyceryl tri-acrylate or -methacrylate; glycidyl acrylate or methacrylate; pentaerythritol tri- or tetra-acrylate or tri- or tetra-methacrylate; diallyl phthalate; 2,2-bis(4-methacryloxyphenyl)-propane; diallyl adipate; di(2-acryloxyethyl) ether; dipentaerythritol pentacrylate; neopentyl glycol diacrylate; polypropylene glycol diacrylate or dimethacrylate; 1,3,5-tri-(2-(meth)acryloxyethyl)-s-triazine; hexamethylene diacrylate; poly(ethylenically unsaturated alkoxy) heterocycles, as taught in U.S. Pat. No. 4,262,072; and adducts of poly(isocyanates) with hydroxy- and amino- functional acrylates, such as EB 220 sold by UCB-Radcure of Smyrna, Ga. Crosslinking agents are preferred that result in a polymer with a high refractive index. Preferably, the refractive index is greater than 1.56 and most preferably the refractive index is greater than 1.58. One such crosslinking agent, which is especially useful, is EB 220.

Preferably, all three methods are combined. A crosslinking agent is added to the resin and the resin is cured at an elevated temperature and then subjected to a post-cure heat treatment. Alternatively, any of the two methods may also be combined such as adding a crosslinking agent to the resin and then curing the resin at an elevated temperature or the resin is cured at an elevated temperature and then subjected to post-cure heat treatment. A crosslinking agent may be added to the resin which is then cured at ambient temperature while post-cured at a temperature at least equal to the normal glass transition temperature as described previously.

The resin is post-cure heat treated at a temperature at least equal the normal glass transition temperature for 30 to 60 seconds. The post-cure heat treatment is preferably at a temperature of at least 10° C. (10° K.) above the glass transition temperature and most preferably at a temperature of greater than 20° C. (20° K.) above the glass transition temperature. For the oligomeric composition that is a blend of epoxy diacrylate and phenoxyethyl acrylate, the post-cure heat treatment is preferably at a temperature between 80° C. (353° K.) and 110° C. (383° K.) for 60 seconds.

A testing method has also been developed to define satisfactory groove tip impression resistance of the brightness enhancement film of the present invention. The test measures groove tip impression penetration. In most cases, the groove tip impression penetration test has been found to provide a good correlation to visible groove tip impressions.

The groove tip impression penetration is measured according to the following test procedure. The groove tip impression penetration test is preferably conducted on a table floating on an air cushion to minimize the external effects on the groove tip impression penetration results.

The brightness enhancement film is cut into a 100 mm square. A flat and smooth glass plate is placed on the air cushioned table. The brightness enhancement film is then placed on the glass plate. The grooves in the brightness enhancement film are oriented in the up direction.

Three steel balls are affixed to one side of a circular steel plate in a triangular orientation. The steel balls preferably have a diameter of 3 mm. The steel plate preferably has a diameter of 100 mm. The steel balls and steel plate unit weighs approximately 600 grams.

The steel plate is then placed on the brightness enhancement film sample with the steel balls oriented against the brightness enhancement film. Additional steel plates, weighing approximately 3,327 grams, may also be placed on the 100 mm diameter steel plate.

After dwelling on the brightness enhancement film for 30 minutes, the balls and the steel plates are removed from the brightness enhancement film. The penetration of the steel balls into the brightness enhancement film is measured using a Supramess Mahr dial indicator having 0.000002 inch (0.05 micron) increments. The Supramess Mahr dial indicator is preferably mounted on a Ono Sokki ST-022 gauge stand.

The glass transition temperature is preferably measured as a peak in the tan δ curve obtained from dynamic mechanical analysis of the composite in tensile mode using a dynamic mechanical analyzer, such as a Rheometrics RSA-II.

All of the curing and heat treating methods for increasing the glass transition temperature have been used and it appears not to make a difference as to which method is used. As long as the glass transition temperature is elevated, the groove tip impression penetration is reduced.

Figure 3:
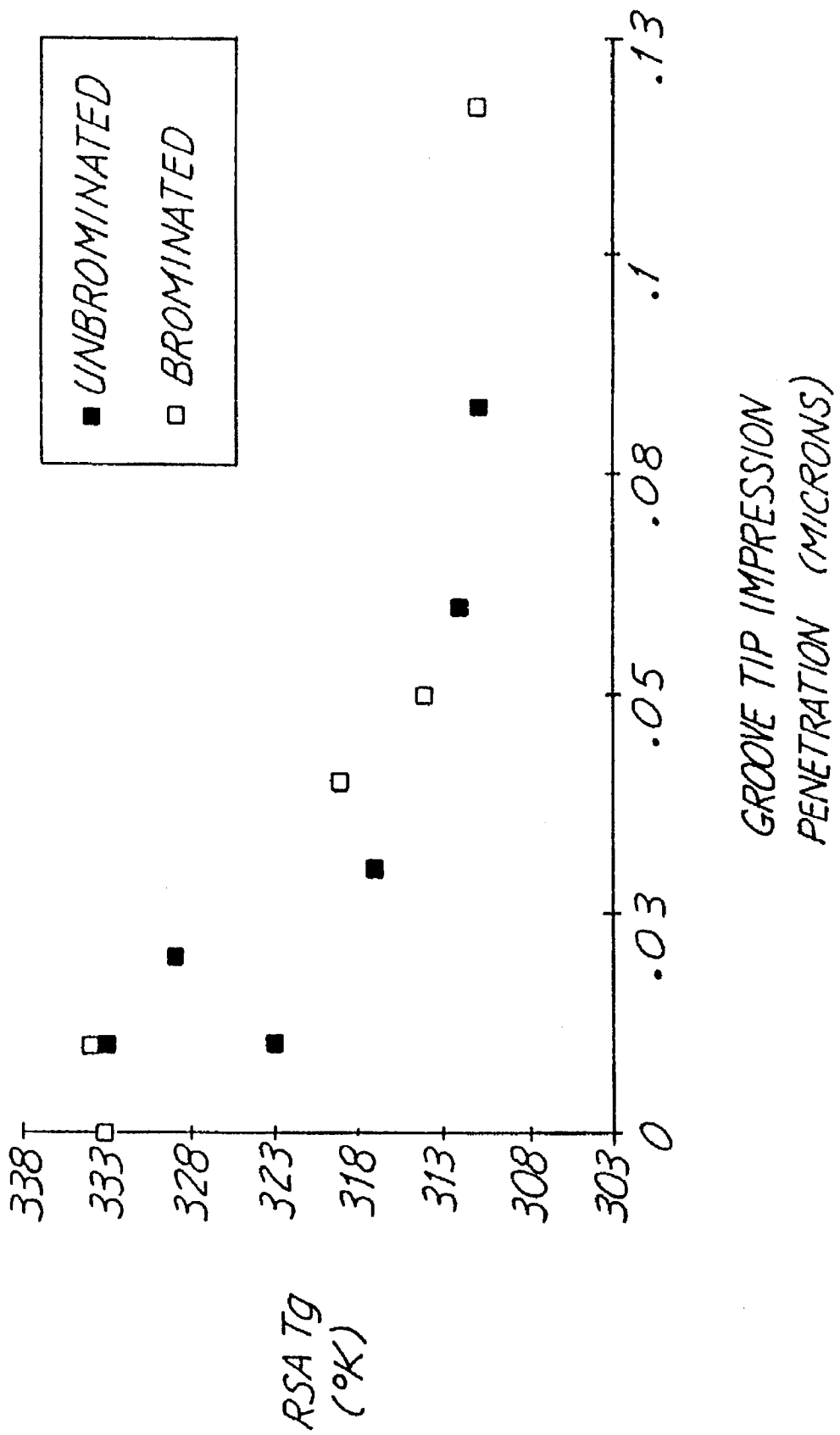
FIG. 3 is a graph of groove tip impression penetration versus glass transition temperature for brightness enhancement films produced according to the method of the present invention.

The groove tip impression penetration results from several samples of brightness enhancement film are illustrated in FIG. 3. From these results it can be seen that there is a good correlation between groove tip impression penetration and glass transition temperature.

The tests were conducted using two types of brightness enhancement film. One type of brightness enhancement film contains brominated resin and the other type of brightness enhancement film contains unbrominated resin. The brominated resin contains 60 percent by weight RDX 51027 and 40 percent by weight PHOTOMER Brand 4035. The unbrominated resin contains 60 percent by weight PHOTOMER Brand 3016 and 40 percent by weight PHOTOMER Brand 4035.

From FIG. 3, it can be seen that the unbrominated resin and brominated resin fall on the same general curve. Based on these results, it can be concluded that the relationship between groove tip impression penetration and glass transition temperature is a physical relationship, which is not dependent upon composition. Similarly, since low groove tip impression penetration is correlated to reduced groove tip impression, the glass transition temperature relates similarly to groove tip impression.

As can be seen from the curve in FIG. 3, several samples of ultraviolet radiation cured brightness enhancement film composites have been prepared that exhibit very low groove tip impression penetration. For nearly all of these samples, the groove tip impression penetration is less than $4.0 \times 10^{-6}$ inches (0.1 microns). These results are a significant improvement over previously prepared samples.

For most applications of brightness enhancement film, the use temperature is very close to normal room temperature of approximately 20° C. (293° K.). However, some display manufacturers require testing of all their components at 65° C. (338° K.). With prior art brightness enhancement film, even when cured at elevated temperature, the glass transition temperature is not high enough to avoid groove tip impressions at the elevated testing temperature. This is especially true in situations in which two pieces of brightness enhancement film are used one on top of the other with grooves crossed, as in Whitehead, U.S. Pat. No. 4,542,449.

The glass transition temperature of the brightness enhancement film resin can be raised by the inclusion of additional crosslinking agents, as described above, and by utilizing the elevated cure temperature method disclosed herein as illustrated in the Table. The item indicated as "HHA" is hydantoin hexaacrylate, which was prepared according to Wendling et al., U.S. Pat. No. 4,262,072. Sample E was prepared with the crosslinking agent EB 220. These data show clearly that the glass transition temperature of the brightness enhancement film resin can be raised significantly with minimal decrease of refractive index by proper choice of crosslinking agents and curing conditions.

TABLE

|  | Sample | | | | |
| --- | --- | --- | --- | --- | --- |
| Component | A | B | C | D | E |
| RDX 51027 (%) | 60 | 60 | 51 | 42 | 51 |
| PHOTOMER 4035 (%) | 40 | 40 | 34 | 28 | 34 |
| HHA (%) |  |  | 15 | 30 |  |
| EB 220 (%) |  |  |  |  | 15 |
| Properties |  |  |  |  |  |
| Cure Temperature (°K.) | 298 | 373 | 373 | 373 | 373 |
| Glass Transition Temperature (°K.) | 311 | 339 | 348 | 353 | 353 |
| Refractive Index | 1.589 | 1.593 | 1.577 | 1.567 | 1.580 |

Although the present invention has been described with reference to preferred embodiments, workers skilled in the art will recognize that changes may be made in form and detail without departing from the spirit and scope of the invention.

What is claimed is:

1. A method of improving groove tip impression resistance in a microstructure bearing article, the method comprising:

forming a desired microstructure in a first layer on a base from an oligomeric resin;

curing the resin of the first layer; and heat treating the first layer at a temperature that is at least equal to a normal glass transition temperature of the resin, the heat treating raising the glass transition temperature of the resulting polymer above about 333° K. such that groove tip impression is reduced.

2. The method of claim 1 wherein the microstructure has adjacent polymeric tips and grooves, and the tips have an included angle in the approximate range of 70° to 120°.

3. The method of claim 2 wherein the included angle is in the approximate range of 80° to 100°.

4. The method of claim 1 wherein the curing step is performed prior to the heat treating step.

5. The method of claim 1 wherein the curing step and the heat treating step are performed simultaneously.

6. The method of claim 1 wherein the oligomeric resin is crosslinkable.

7. The method of claim 6 further comprising the step of adding crosslinking agents to the oligomeric resin to facilitate the raising of the glass transition temperature of the resulting polymer above the normal glass transition temperature such that groove tip impression is reduced.

8. The method of claim 6 wherein crosslinking is initiated by ultraviolet radiation.

9. The method of claim 1 wherein the heat treating is performed at a temperature that is at least 10 degrees Kelvin greater than the normal glass transition temperature of the resin.

10. The method of claim 9 wherein the heat treating is performed at a temperature that is at least 20 degrees Kelvin greater than the normal glass transition temperature of the resin.

11. The method of claim 1 wherein the heat treating reduces groove tip impression penetration to less than $1 \times 10^{-4}$ mm.

12. The method of claim 1 wherein the base has a sputter etched surface adjacent the first layer.

13. The method of claim 1 wherein a photoinitiator is used for the curing.

14. A method of forming a microstructure bearing article that exhibits reduced groove tip impression, the method comprising:

preparing an oligomeric composition;

depositing the oligomeric resin composition onto a master negative microstructured surface or onto a substrate in an amount barely sufficient to fill cavities of the master;

filling the cavities by moving a bead of the oligomeric resin composition between the substrate and the master, at least one of which is flexible, the oligomeric resin composition forming the desired microstructure;

curing the oligomeric resin that forms the desired microstructure; and heat treating the desired microstructure at a temperature that is at least equal to a normal glass transition temperature of the resin, the heat treating raising the glass transition temperature of the resulting polymer above about 333° K. such that groove tip impression is reduced.

15. The method of claim 14 wherein the desired microstructure has adjacent polymeric tips and grooves, and wherein the tips have an included angle in the approximate range of 70° to 120°.

16. The method of claim 15 wherein the included angle is in the approximate range of 80° to 100°.

17. The method of claim 14 wherein the curing step is performed prior to the heat treating step.

18. The method of claim 14 wherein the curing step and the heat treating step are performed simultaneously.

19. The method of claim 14 wherein the oligomeric resin is crosslinkable.

20. The method of claim 14 and further comprising the step of adding crosslinking agents to the oligomeric composition to facilitate the raising of the glass transition temperature of the resulting polymer above the normal glass transition temperature to a level such that groove tip penetration is reduced.

21. The method of claim 19 wherein crosslinking is initiated by ultraviolet radiation.

22. The method of claim 14 wherein the heat treating is performed at a temperature that is at least 10 degrees Kelvin greater than the normal glass transition temperature of the resin.

23. The method of claim 22 wherein the heat treating is performed at a temperature that is at least 20 degrees Kelvin greater than the normal glass transition temperature of the resin.

24. The method of claim 14 wherein the heating treating reduces groove tip impression penetration to less than $1 \times 10^{-4}$ mm.

25. The method of claim 14 wherein a photoinitiator is used for the curing.

26. The method of claim 14 wherein the substrate has a sputter etched surface adjacent the microstructure.

27. The method of claim 1 wherein the oligomeric resin provides a cured polymer having a refractive index that is greater than 1.56.

28. The method of claim 1 wherein the oligomeric resin provides a cured polymer having a refractive index that is greater than 1.58.

29. The method of claim 1 wherein said oligomeric resin comprises epoxy diacrylate, bromine modified epoxy diacrylate, isobornyl acrylate, methyl methacrylate, cyclohexylchloroacrylate, 2-chlorostyrene, 2,4-dichlorostyrene, styrene, acrylic acid, acrylamide, acrylonitrile, methacrylonitrile, phenoxyethyl acrylate, tribromophenoxyethyl acrylate, benzyl acrylate, alkoxylated epoxy diacrylate, bromine modified alkoxylated epoxy diacrylate or combinations thereof.

* * * * *